(12) United States Patent
Ohno et al.

(10) Patent No.: US 10,901,134 B2
(45) Date of Patent: *Jan. 26, 2021

(54) OPTICAL INSPECTION APPARATUS

(71) Applicant: KABUSHIKI KAISHA TOSHIBA, Tokyo (JP)

(72) Inventors: Hiroshi Ohno, Tokyo (JP); Takahiro Kamikawa, Tokyo (JP); Takehiro Hato, Tokyo (JP); Hiroya Kano, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/288,301

(22) Filed: Feb. 28, 2019

(65) Prior Publication Data

US 2020/0088933 A1 Mar. 19, 2020

(30) Foreign Application Priority Data

Sep. 14, 2018 (JP) .................................. 2018-173038

(51) Int. Cl.
*F21V 8/00* (2006.01)
*G01N 21/88* (2006.01)
(Continued)

(52) U.S. Cl.
CPC ......... *G02B 6/0046* (2013.01); *G02B 6/0055* (2013.01); *G02B 6/0068* (2013.01);
(Continued)

(58) Field of Classification Search
CPC .......... G01N 21/9054; G01N 21/9018; G01N 21/952; G01N 21/8806; G01N 21/90;
(Continued)

(56) References Cited

U.S. PATENT DOCUMENTS 4,617,619 A * 10/1986 Gehly ....................... F21V 7/22
362/282
4,706,168 A * 11/1987 Weisner ................. G01B 11/00
362/18

(Continued)

FOREIGN PATENT DOCUMENTS

| JP | 2002-328094 A | 11/2002 |
| JP | 2008-209726 A | 9/2008 |
| JP | 2010-251168 A | 11/2010 |

*Primary Examiner* — Hoa Q Pham
(74) *Attorney, Agent, or Firm* — Finnegan, Henderson, Farabow, Garrett & Dunner, L.L.P.

(57) ABSTRACT

According to one embodiment, an optical inspection apparatus including: an imaging optical system; one or more light sources; a light guide which extends cylindrically along an optical axis of the imaging optical system and whose end face is opposed to the one or more light sources; a total reflecting surface formed on an inner surface of the light guide to totally internally reflect light struck into the light guide from the end face; a mirror surface formed on an outer surface of the light guide to reflect light struck into the light guide from the one or more light sources, toward the inspection target; and a transmission surface formed on the inner surface of the light guide to transmit the light reflected by the mirror surface, toward the inspection target.

19 Claims, 7 Drawing Sheets

(51) Int. Cl.
*G07D 7/121* (2016.01)
*G07D 5/00* (2006.01)

(52) U.S. Cl.
CPC ....... *G02B 6/0085* (2013.01); *G01N 21/8806* (2013.01); *G07D 5/005* (2013.01); *G07D 7/121* (2013.01); *G07D 2205/00* (2013.01); *G07D 2207/00* (2013.01)

(58) Field of Classification Search
CPC ............. G01N 21/9045; G01N 21/909; G01N 2033/0081; G01N 15/0227; G01N 11/306
USPC ................ 356/600, 237.1–237.5; 250/223 B, 250/339.06, 559.45; 348/125, 127, 131
See application file for complete search history.

(56) References Cited

U.S. PATENT DOCUMENTS

| | | | |
|---|---|---|---|
| 4,731,649 A * | 3/1988 | Chang ................ | G01N 21/9054 250/223 B |
| 5,661,294 A * | 8/1997 | Buchmann ......... | G01N 21/9054 250/223 B |
| 5,923,419 A * | 7/1999 | Thomas ............... | G01N 21/909 356/239.4 |
| 8,033,673 B2 * | 10/2011 | Shimokawa ......... | G02B 21/082 353/64 |
| 10,620,389 B1 * | 4/2020 | Kamikawa ........... | G02B 6/0096 |
| 2007/0206183 A1 * | 9/2007 | Lebens ................. | G01N 21/21 356/237.2 |
| 2008/0024794 A1 * | 1/2008 | Miyazaki ........... | G01N 21/8806 356/612 |
| 2012/0200849 A1 * | 8/2012 | Balducci ............ | G01N 21/8806 356/240.1 |

* cited by examiner

OPTICAL INSPECTION APPARATUS

CROSS-REFERENCE TO RELATED APPLICATIONS

This application is based upon and claims the benefit of priority from prior Japanese Patent Application No. 2018-173038, filed Sep. 14, 2018, the entire contents of which are incorporated herein by reference.

FIELD

Embodiments described herein relate generally to an optical inspection apparatus capable of inspecting an inspection target optically.

BACKGROUND

There is a noncontact inspection method for inspecting unevenness of an object. In this method, light is scattered by an uneven portion of the object using oblique-incidence lighting, and the scattered light is imaged. In order to inspect an object irrespective of its azimuth direction, oblique-incidence ring lighting has conventionally been used. The less the variation in angle of light incident upon the object, the more accurately the object can be inspected. In other words, the narrower the distribution angle of the light, the more accurately the inspection can be conducted.

BRIEF DESCRIPTION OF THE DRAWING

FIG. 8($a$) is a diagram showing the illuminance distribution analyzed using light tracking simulation of the optical inspection apparatus of the second embodiment.

FIG. 8($b$) is a diagram showing the illuminance distribution on the line F8($b$)-F8($b$) in FIG. 6, which is included in the illuminance distribution shown in FIG. 8($a$).

DETAILED DESCRIPTION

According to one embodiment, an optical inspection apparatus including: an imaging optical system opposed to an inspection target; one or more light sources provided around the imaging optical system and spaced away from one another; a light guide which extends cylindrically along an optical axis of the imaging optical system and whose end face is opposed to the one or more light sources; a total reflecting surface formed on an inner surface of the light guide to totally internally reflect light struck into the light guide from the end face; a mirror surface formed on an outer surface of the light guide to reflect light struck into the light guide from the one or more light sources, toward the inspection target; and a transmission surface formed on the inner surface of the light guide to transmit the light reflected by the mirror surface, toward the inspection target.

An optical inspection apparatus according to each of the embodiments will be described below with reference to the accompanying drawings. The optical inspection apparatus can inspect, for example, the shape of the surface of an inspection target in detail. In the following embodiments, the optical inspection apparatus authenticates coins and bills, inspects the presence of absence of defects (e.g. a crack) in products on a production line of a factory, and the like. It can also be used to make other inspections.

The drawings are schematic or conceptual. The relationship in thickness and width among the components, the size ratio among the components, or the like in the drawings is not always the same as the actual one. Even though the components shown in the drawings are the same, their dimensions and ratios may vary from drawing to drawing. Throughout the specification and drawings, the same components are denoted by the same reference symbol and their overlapping descriptions may be omitted as appropriate.

First Embodiment

Figure 1:
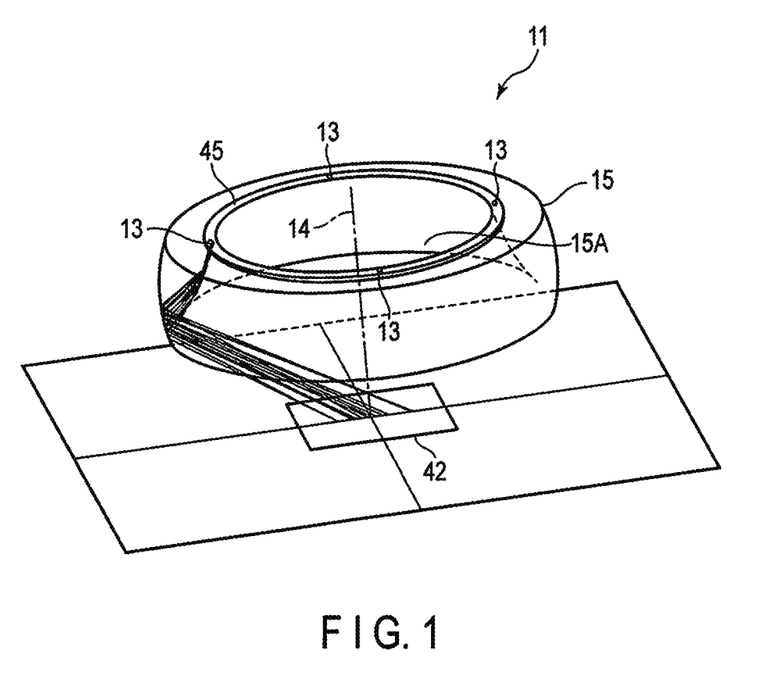
FIG. 1 is a perspective view showing an optical inspection apparatus of a first embodiment.
Figure 2:
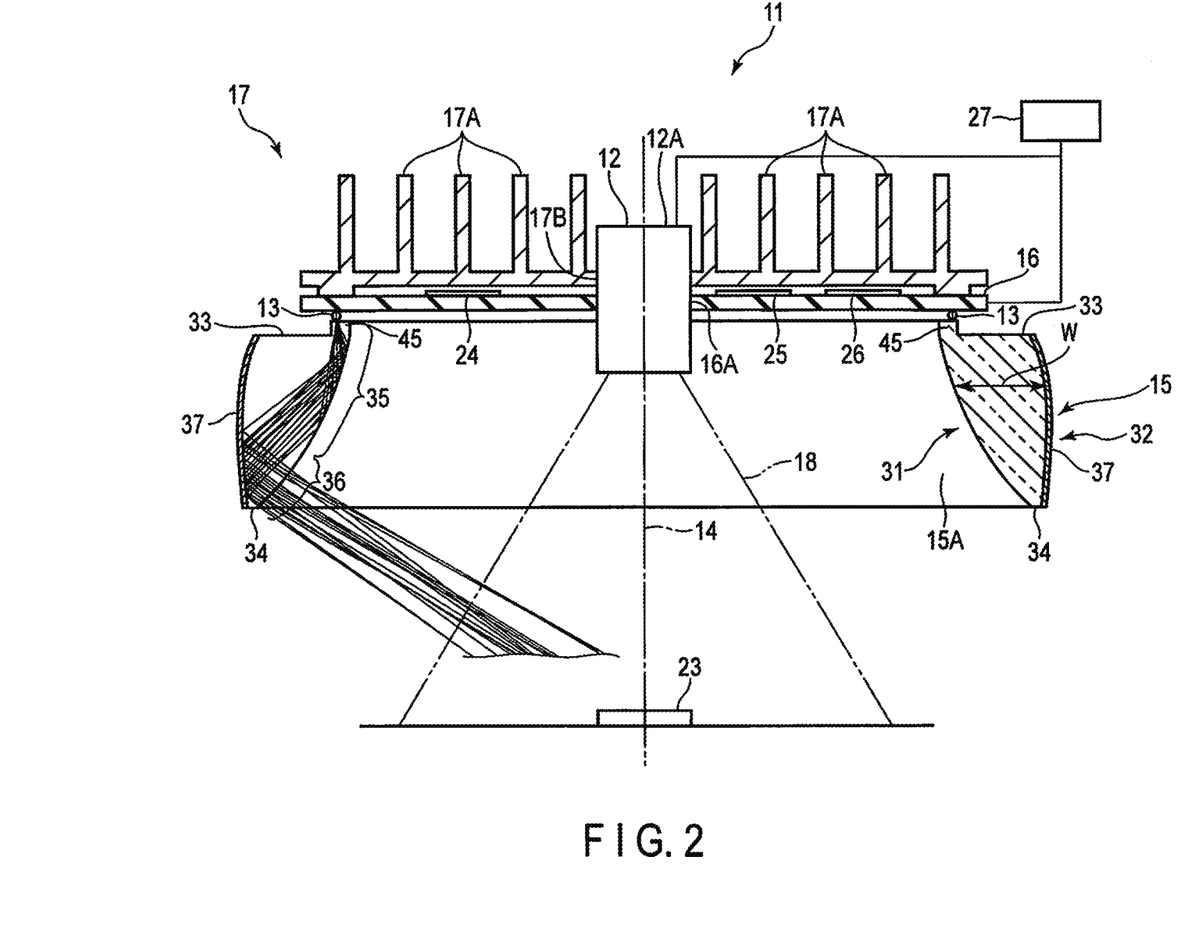
FIG. 2 is a sectional view of the optical inspection apparatus shown in FIG. 1, which is cut along the surface including an optical axis of the apparatus.

FIG. 1 is a perspective view showing an optical inspection apparatus 11 of a first embodiment, and FIG. 2 is a sectional view of the optical inspection apparatus 11 shown in FIG. 1, which is cut along the surface including an optical axis 14 of the apparatus 11. As shown in FIGS. 1 and 2, the optical inspection apparatus 11 includes an imaging optical system 12 opposed to an inspection target 23, one or more light sources 23 provided around the imaging optical system 12, a cylindrical light guide 15 provided along the optical axis 14, a substrate 16 mounted with the light sources 13, and a heat sink 17 attached to the substrate 16.

In the first embodiment, the number of light sources 13 is, e.g. 4, but it is not limited to four. The number may be one, two, three or five or more. Each of the light sources 13 includes, e.g. a light emitting diode (LED).

The light sources 13 are spaced away from each other. The light sources 13 are arranged, for example, on the circumference of one circle with the optical axis 14 centered. The light sources 13 are arranged at substantially equal intervals and located to rotate an object around the optical axis 14 symmetrically. More specifically, the light sources 13 are arranged at four positions of rotational symmetry and, in other words, the light sources 13 are arranged at four positions corresponding to the azimuth angle of 0°, that of 90°, that of 180° and that of 270° around the optical axis 14. The "rotational symmetry" means that when an object is rotated around an axis of rotational symmetry, it is returned to its original position at a rotation angle of less than 360°. The light sources 13 are configured by white LEDs, for example. The light emitted from the light sources 13 is not limited to visible light but may be infrared light or ultraviolet light.

Figure 3:
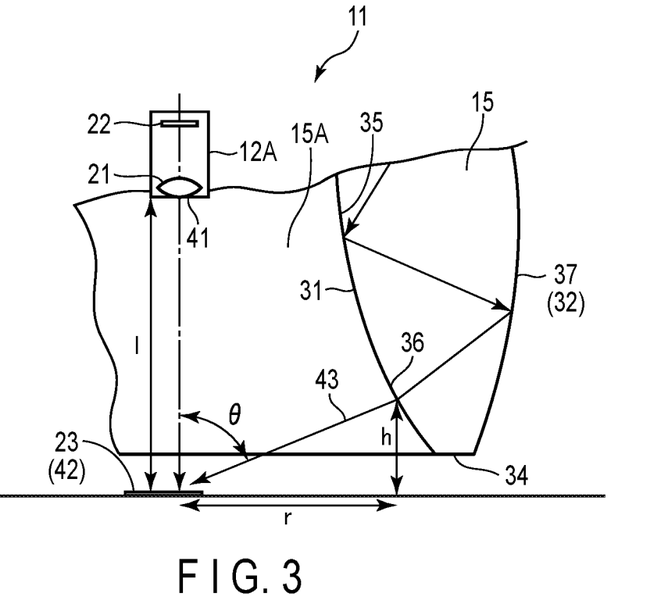
FIG. 3 is a schematic view showing the relationship among the position, dimensions and angle of the optical inspection apparatus shown in FIG. 2.

The imaging optical system 12 is configured by a commonly-used digital camera. As shown in FIG. 3, the imaging optical system 12 includes a lens 21 that composes a pupil mirror and an imaging element 22 (CCD and CMOS). The imaging optical system 12 can capture a still image of the inspection target 23 and may also capture a moving image thereof. The optical axis 14 (main optical axis) is defined by the lens 21 and the imaging element 22. The imaging optical system 12 may be provided such that its outside lens case 12A is in contact with the heat sink 17. Heat of the imaging optical system 12 can thus be allowed to escape toward the heat sink 17.

As shown in FIG. 2, the heat sink 17 is formed of copper, an aluminum alloy or the like, which is metal having high thermal conductivity. The heat sink 17 includes a plurality of heat dissipation fins 17A. The heat sink 17 may thermally be connected to the light sources 13 through, for example, a structure (a pad, a through hole, etc.) of a conductive metal (e.g. copper) on the substrate 16 or thermally be connected directly to the light sources 13. The heat sink 17 may include, for example, an opening 17B, and the imaging optical system 12 may be inserted inside the opening 17B.

The substrate 16 is configured by a generally-used printed circuit board. The substrate 16 is mounted with a control circuit 24, an image processing circuit (image processing chip) 25, the light sources 13, a storage device 26 for image recording. As shown in FIG. 2, the substrate 16 and the imaging optical system 12 receive power from a power supply 27. The control circuit 24 is electrically connected to the light sources 13 to allow the light sources 13 to be turned on and turned off individually. The control circuit 24 can be implemented by a CPU, a ROM, a RAM or the like. The CPU can be replaced with an application specific integrated circuit (ASIC), a programmable logic device (PLD) or a field programmable gate array (FPGA). Alternatively, the control circuit 24 may be implemented by a one-chip microcomputer or the like.

As shown in FIG. 2, the substrate 16 includes a through-hole portion 16A. The imaging optical system 12 passes through the through-hole portion 16A and is fixed to the substrate 16. In the first embodiment, therefore, the light sources 13, imaging optical system 12 and heat sink 17 are fixed to the substrate integrally as a single unit. It is thus easy to handle the substrate 16, light sources 13, imaging optical system 12 and heat sink 17 when the optical inspection apparatus 11 is taken apart for maintenance.

The imaging optical system 12 is electrically connected to the control circuit 24 and the image processing circuit 25. The control circuit 24 can control the image processing circuit 25 to process the image captured by the imaging optical system 12 and display the processed image on a display unit such as a display (not shown). The control circuit 24 can also store the image processed by the image processing circuit 25 in the storage device 26 if necessary. Alternatively, the control circuit 24 may transmit image information to another personal computer and the like via a communication cable, a wireless LAN or the like. The storage device 26 is configured by a storage device of a semiconductor memory system, such as a solid state drive (SSD) and may, of course, be another storage device such as a hard disk drive (HDD).

The light guide 15 is formed like a hollow cylinder by light-transmitting material. The central axis of the light guide 15 is consistent with the optical axis 14 of the imaging optical system 12. The diameter of the inner surface 31 (the inner diameter) of the light guide 15 increases as it moves away from the imaging optical system 12. The light guide 15 includes a sufficiently large hollow region 15A inside. The inner surface 31 of the light guide 15 is thus prevented from falling within a view range 18 of the imaging optical system 12. In the present embodiment, therefore, the viewing angle of the imaging optical system 12 is widely secured.

The light guide 15 has only to be made of any light-transmitting material and it is made favorably of a light-transmitting resin material such as acrylic; however, the material of the light guide 15 is not limited thereto. The light guide 15 may be made of polycarbonate, glass or the like. The light guide 15 can be formed by injection molding or machining (cutting by a lathe, an NC lathe, etc.).

Figure 4:
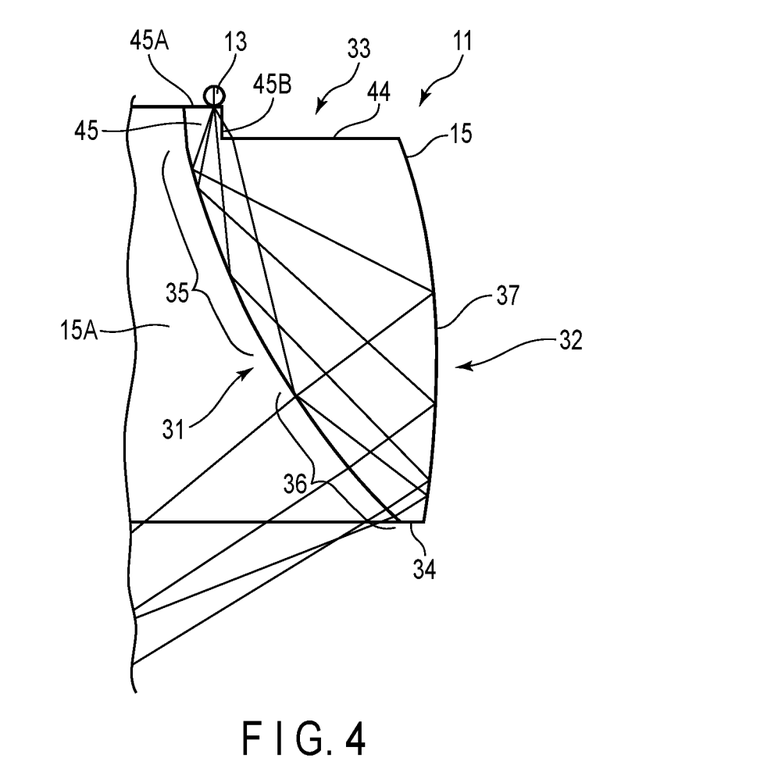
FIG. 4 is a schematic view showing part of the results of light tracking simulation of a light beam emitted from a light source in the optical inspection apparatus shown in FIG. 2.

As shown in FIGS. 2 and 4, the light guide 15 has the inner surface (inner peripheral surface) 31, an outer surface (outer peripheral surface) 32, a first end face (incident surface, end face) 33 alongside the imaging optical system 12, a second end face 34 alongside the inspection target 23, a total reflecting surface 35 provided on the inner surface 31, and a transmission surface 36 provided on the inner surface 31. The inner surface 31 is close to the main optical axis 14 and the outer surface 32 is far from the main optical axis 14. As shown in FIG. 2, the thickness W between the inner surface 31 and the outer surface 32 of the light guide 15 decreases as it moves away from the imaging optical system 12 (the light sources 13). The first end face 33 is opposed to the light sources 13.

As shown in FIG. 2, the outer surface 32 is configured by a mirror surface 37 that reflects light, which has entered the light guide 15 from the light sources 13, toward the inspection target 23. The mirror surface 37 of the light guide 15 is an arc surface that is projected in a direction away from the optical axis 14. The mirror surface 37 is formed by depositing aluminum or the like on the outer surface 32. The method of forming the mirror surface 37 is not limited to this. For example, another member having a mirror surface may be brought into intimate contact with the outer surface 32 so that the outer surface 32 reflects light.

The inner surface 31 is an arc surface that is projected in a direction approaching the optical axis 14. The inner surface 31 includes a total reflecting surface 35 located alongside the imaging optical system 12 and a transmission surface 36 located alongside the inspection target 23. The total reflecting surface 35 is provided closer to the light sources 13 than the transmission surface 36. Unlike the outer surface 32, the inner surface 31 is transparent. The inner surface 31 is smoothed by surface treatment such as buffing. However, the surface treatment of the inner surface 31 is not limited to this. The transmission surface 36 of the inner surface 31 may, for example, be sandblasted to serve as a diffusion surface capable of diffusing light that has been transmitted through the transmission surface 36.

The total reflecting surface 35 can totally internally reflect the light that has struck into the light guide 15 from the first end face 33. The transmission surface 36 transmits the light reflected by the mirror surface 37 toward the inspection target 23. At that time, the transmission surface 36 refracts the light transmitted through the transmission surface 36.

As shown in FIGS. 2 and 4, the first end face 33 includes a flat surface 44 and a light guide convex portion 45 projecting like a step from the flat surface 44. The light guide convex portion 45 is shaped like ring (see FIG. 1) and opposed to the light-emitting surface of each of the light sources 13. The light guide convex portion 45 includes a top surface 45A and a side surface 45B. The light guide convex portion 45 protrudes toward the light sources 13 along the inner surface 31 of the light guide 15. The thickness of the light guide convex portion 45 is smaller than the thickness W between the inner and outer surfaces 31 and 32. The second end face 34 is opposed to the first end face 33.

The light guide 15 is fixed to the substrate 16 by fitting, screwing or the like. The optical inspection apparatus 11 may include a case surrounding the imaging optical system 12, light sources 13, light guide 15, substrate 16 and heat sink 17, and the light guide 15 and the substrate 16 may be positioned with reference to the case.

The irradiation field (inspection surface 42) which is irradiated with light from the light guide 15 is located in a position of, e.g. 5 mm from the second end face 34 that is the distal end of the light guide 15, but the position of the irradiation field is not limited thereto. The optical inspection apparatus 11 of the first embodiment can favorably be used to inspect, for example, a coin as the inspection target. The optical inspection apparatus 11 can favorably inspect, e.g. irregularities of a coin to authenticate the coin.

Assume that the distance from the incident pupil surface 41 of the imaging optical system 12 to the image forming surface 42 is l as shown in FIG. 3. Usually, a clear image can be captured by making the image forming surface 42 and the irradiation surface coincident with each other. Also, assume that the light distribution angle of a main light beam 43 of irradiation light is θ. Further, assume that the distance from the image forming surface 42 of a point where the main light beam 43 is emitted from the light guide 15 (the irradiation surface when matching the irradiation surface) is h, and the distance from the main optical axis 14 is r. The light guide 15 is configured to extend to the image forming surface 42 from the incident pupil surface 41 along the main optical axis 14, and the extension distance L is shorter than at least the distance l as given by the following numerical expression:

$$L < l \qquad \text{[numerical expression 1]}$$

It is thus possible to make the irradiation surface and the image forming surface 42 coincident with each other and thus capture a clear image.

The following relationship between the above distances h and r is derived by geometry:

$$h = \frac{r}{\tan\theta} \qquad \text{[numerical expression 2]}$$

When the shortest distance from the main optical axis 14 of the inner surface of the light guide 15 is defined as R, the following expression is given:

$$h \geq \frac{R}{\tan\theta} \qquad \text{[numerical expression 3]}$$

The extension distance L of the light guide 15 should be at least a value given by the following expression:

$$l - \frac{R}{\tan\theta} < L \qquad \text{[numerical expression 4]}$$

From the above, the following relationship can be derived:

$$l - \frac{R}{\tan\theta} < L < l \qquad \text{[numerical expression 5]}$$

An operation of the optical inspection apparatus 11 of the first embodiment will be described below with reference to FIGS. 2, 4 and 5.

The light emitted from the light sources (LED) 13 strikes into the light guide 15 from the light guide convex portion 45 (top surface 45A) of the first end face 33. Of the light struck into the light guide convex portion 45, light traveling to the inside (inspection target 23) is reflected toward the mirror surface 27 by the total reflecting surface 35 of the inner surface 31 (see FIGS. 2 and 4). The light arrived at the mirror surface 37 is reflected toward the inside transmission surface 36. The light is refracted at a slight angle on the transmission surface 36, and the inspection target 23 is irradiated with the light.

Of the light struck into the light guide convex portion 45, light traveling to the outside is totally internally reflected by the side surface 45B of the light guide convex portion 45 and guided to the total reflecting surface 35 on the inside. The light guided to the total reflecting surface 35 is totally internally reflected and guided toward the mirror surface 37. The light arrived at the mirror surface 37 is reflected toward the inside transmission surface 36. The light is refracted at a slight angle on the transmission surface 36, and the inspection target is irradiated with the light.

As shown in FIG. 4, the light that is not struck into the light guide convex portion 45 (top surface 45A) but struck into the flat surface 44 directly from the light sources 13, is also totally internally reflected by the total reflecting surface 35 and guided toward the outside mirror surface 37. The light arrived at the mirror surface 37 is reflected toward the inside transmission surface 36. The light is refracted at a slight angle on the transmission surface 36, and the inspection target 23 is irradiated with the light. The imaging optical system 12 can thus detect light (scattered light) that is radiated to the inspection target 23 and reflected by the inspection target 23 (scattered light) to obtain an image of the detection target 23.

In the first embodiment, the light guide 15 has a rotationally symmetrical structure (cylindrical structure) as shown in FIG. 1, and the mirror surface 37 is provided outside the light guide 15, and the total reflecting surface 35 and the transmission surface 36 are provided inside the light guide 15. This structure makes it possible to widen a region and reduce a divergence angle by folding a light beam using the Etendue conservation law.

The Etendue conservation law is as follows. Assume first that the cross-sectional area of a certain surface is $A_1$, the average divergence angle of points on the surface is $\Theta_1$, the cross-sectional area of a surface different from the certain surface is $A_2$, the average divergence angle of points on the surface is $\Theta_2$, and the refractive index of a material composing the light guide is n. Amount E is conserved as given by the following equation, even though a light beam travels. This is the Etendue conservation law.

$$E = \pi n^2 A_1 \sin^2\Theta_1 = \pi n^2 A_2 \sin^2\Theta_2 \qquad \text{[numerical expression 6]}$$

In the first embodiment, the divergence angle of light emitted through the transmission surface 36 located close to the inspection target 23 can be decreased, while guiding light from the small number of light sources 13 through the first end face 33 (incident surface) in the direction of the inspection target and spreading the light in the circumferential direction and the thickness direction of the light guide 15.

That is, according to the optical inspection apparatus 11 of the first embodiment, the use of the light guide 15 makes it possible to narrow the distribution of light by widening an irradiation area even though the number of light sources 13 is small. If the distribution of light can be narrowed, the angle of incidence on the inspection target 23 does not vary, with the result that the inspection target 23 can be inspected with higher accuracy.

Figure 5:
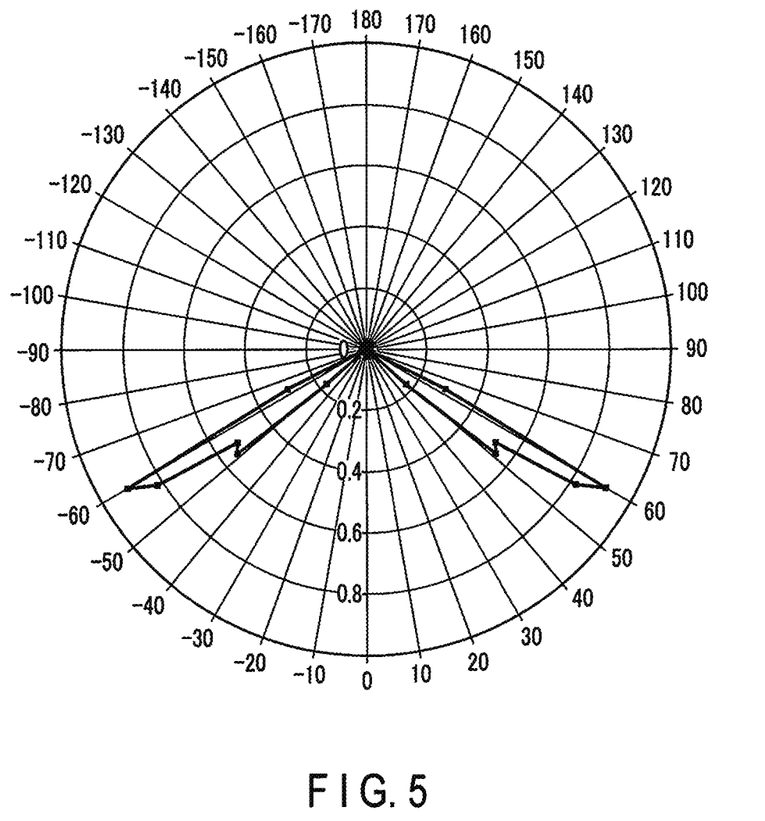
FIG. 5 is a diagram showing the distribution of light calculated using the results of light tracking simulation of a light beam emitted from the light source in the optical inspection apparatus shown in FIG. 2.

FIG. 5 shows the distribution of light calculated using light tracking simulation. As shown in FIG. 5, oblique-incidence lighting of narrow light distribution can be achieved by combining the light guide 15 and the light sources 13. In the first embodiment light is emitted at a distribution angle of −55° and 55°. According to the results of the simulation, the angle width of the light distribution angle is about 10°. It can be understood that a sufficiently narrower light distribution is achieved in the first embodiment than that in a generally-used conventional shell type LED because the light distribution angle of the shell type LED is 20° or more.

The light beam struck on the light guide 15 from the light sources 13 can spread in the circumferential direction (the rotational direction when the main optical axis 14 is the rotation axis) as the light beam travels in the light guide 15. That is, the light beams spread uniformly from the light sources 13.

In the first embodiment, since the light sources 13, imaging optical system 12 and substrate 16 are formed integrally as a single unit, the manufacturing costs can be lowered and the configuration of the apparatus can be compacted. The heat sink 17 for heat dissipation can also be integrated with the substrate 16. Thus, as compared with the case where another heat sink 17 is provided, the costs involved in the heat sink 17 can also be lowered while promoting the cooling of the light sources 13 and improving the reliability of the optical inspection apparatus 11. Furthermore, the optical inspection apparatus 11 can also be compacted.

According to the first embodiment, the following matters can be achieved.

The optical inspection apparatus 11 includes the imaging optical system 12 opposed to the inspection target 23, the light sources 13 provided around and spaced apart from the imaging optical system 12, the light guide 15 which extends cylindrically along the optical axis 14 of the imaging optical system 12 and whose end face is opposed to the light sources 13, the total reflecting surface 35 formed on the inner surface 31 of the light guide 15 to totally internally reflect the light struck into the light guide 15 from the end face, the mirror surface 37 formed on the outer surface 32 of the light guide 15 to reflect the light, which is struck into the light guide 15 from the light sources 13, toward the inspection target 23, and the transmission surface 36 formed on the inner surface of the light guide 15 to transmit the light reflected by the mirror surface 37 to the inspection target 23.

According to the above configuration of the optical inspection apparatus 11, the distribution of light toward the inspection target from the transmission surface 36 can be narrowed using the Etendue conservation law by spreading the light struck into the light guide 15 from the light sources 13 in the light guide 15. The inspection target 23 can thus be inspected with high accuracy. Since, furthermore, the light is spread using the light guide 15, the number of light sources 13 can be made smaller than that in the conventional case. Therefore, the first embodiment can bring about two very excellent advantages of reducing the number of light sources 13 and ensuring high inspection accuracy at the same time. Furthermore, the configuration of the light guide 15 is also simple and the number of parts is small, with the result that the entire manufacturing costs of the optical inspection apparatus 11 can be lowered.

According to the above configuration, the light sources 13 and the imaging optical system 12 can be spaced apart from the inspection target 23. Accordingly, the inspection target can be separated from the light sources 13 serving as heat sources and the imaging optical system 12 to prevent the inspection target from being adversely affected by heat. Since, furthermore, the light sources 13 and the imaging optical system 12 can be arranged relatively close to each other, they can easily be cooled at once, with the result that the optical inspection apparatus 11 can be improved in its cooling performance and reliability.

In this case, the total reflective surface 35 is formed closer to the light sources 13 than the transmission surface 36. The total reflecting surface 35 and the transmission surface 36 may have a shared area. The total reflecting surface 35 and the transmission surface 36 may be common to each other. This configuration can prevent light from leaking outside the light guide 15 before the light is diffused in the light guide 15 using the Etendue conservation law. Thus, the distribution of light toward the inspection target 23 from the transmission surface 36 can be narrowed to achieve a high-accuracy inspection. If the total reflecting surface 35 and the transmission surface 36 have a shared area, the advantage that the entire apparatus can be compacted is obtained. If, furthermore, total reflecting surface 35 and the transmission surface 36 is completely common to each other, the advantage that the apparatus can be compacted further.

In this case, when the distance from the incident pupil surface 41 of the imaging optical system 12 to the inspection target 23 is l, the light distribution angle of the main light beam 43 emitted from the light guide 15 is θ, the closest distance from the optical axis 14 to the inner surface 31 is R, and the extension distance of the light guide 15 from the incident pupil surface 41 along the optical axis 14 is L, the following expression is satisfied:

$$l - \frac{R}{\tan\theta} < L < l \qquad \text{[numerical expression 7]}$$

The foregoing configuration makes it possible to emit the light beam 43 to the intersection between the image forming surface 42 and the optical axis 14 of the imaging optical system 12 at the light distribution angle θ. That is, light can be emitted to the center of the irradiation field at a desired light distribution angle.

The inner surface 31 of the light guide 15 is located outside the view range 18 of the imaging optical system 12. With this configuration, the light guide 15 does not disturb the view range 18 of the imaging optical system 12 but a view that can be acquired by the imaging optical system 12 can sufficiently be widened.

The thickness W between the inner and outer surfaces 31 and 32 of the light guide 15 decreases as it moves away from the imaging optical system 12. With this configuration, for example, the inner surface 31 can be inclined at a position away from the light sources 13. This makes it possible to easily leak light to the inside from the light guide 15 at a position far from the light sources 13. It is thus possible to easily achieve a structure in which the total reflecting surface 35 is formed at a position close to the light sources 13 and the transmission surface 36 is formed at a position far from the light sources 13 on the inner surface 31.

The light guide 15 is shaped like cylinder. This shape makes it possible to spread the light from the light sources 13 without bias in the light guide 15 and minimize the influence of reducing the number of light sources 13. The configuration of the light guide 15 can be simplified and thus the manufacturing costs thereof can be lowered.

In this case, the light guide 15 is configured to increase its inner diameter as it moves away from the light sources 13. With this configuration, the inner surface 31 can be inclined at a position far from the light sources 13. This makes it possible to easily leak light to the inside from the light guide 15 at a position far from the light sources 13. It is thus possible to easily achieve a structure in which the total reflecting surface 35 is formed at a position close to the light sources 13 and the transmission surface 36 is formed at a position far from the light sources 13 on the inner surface 31.

The optical inspection apparatus 11 includes the cylindrical light guide convex portion 45 which protrudes toward the light sources 13 from the end face along the inner surface 31 of the light guide 15 and is provided continuously with the light guide 15. The thickness of the light guide convex portion 45 is smaller than the thickness between the inner and outer surfaces 31 and 32. With this configuration of the light guide convex portion 45, among the light struck into the light guide 15 from the light sources 13, light travelling directly toward the mirror surface 37 can be totally internally reflected toward the total reflecting surface 35. Thus, the light struck from the first end face 33 of the light guide 15 can be prevented from directly travelling toward the mirror surface 37 that is a direction different from the design intent, and light can be guided through a correct path as designed. Accordingly, the number of light beams that can reach the inspection target can be increased, and lighting with high instrument efficiency (the ratio of luminous flux used as lighting to the total luminous flux of the light sources 13) can be achieved. Therefore, even though the number of light sources 13 is reduced, the inspection target 23 (inspection surface 42) is prevented from being darkened.

The mirror surface 37 of the light guide 15 is an arc surface that is projected in a direction away from the optical axis 14. With the configuration of the mirror surface 37, a so-called concave mirror structure can be achieved by the mirror surface 37, and the number of light beams that can reach the inspection target 23 can be increased to improve the instrument efficiency (to brighten the inspection surface 42).

The inner surface 31 of the light guide 15 is an arc surface that is projected in a direction approaching the optical axis 14. With this configuration, the inner surface 31 can extend in a direction substantially along the optical axis 14 at a position close to the light sources 13 and extend in an oblique direction with respect to the optical axis 14 at a position far from the light sources 13. This simple configuration makes it possible to achieve the total reflecting surface 35 and the transmission surface 36, and also simplify the structure of the light guide 15 and lower the manufacturing costs thereof. Furthermore, a strict boundary need not be provided between the total reflecting surface 35 and the transmission surface 36. Therefore, at the midpoint between the total reflecting surface 35 and the transmission surface 36, the total reflecting surface 35 is applied to a certain light beam and the transmission surface 36 is applied to another light beam. If the boundary between the total reflecting surface 35 and the transmission surface 36 is ambiguous as described above, a minor light beam can also travel to the inspection target 23, with the result that instrument efficiency can be improved.

Since the optical inspection apparatus 11 includes the heat sink 17 thermally connected to the light sources 13, heat dissipation can be improved in the light sources 13 and its peripheral devices. It is thus possible to prevent the light sources 13 from being troubled by heat and thus improve the reliability of the optical inspection apparatus 11.

Since the optical inspection apparatus 11 includes the substrate 16 mounted with the light sources 13 and having the through-hole portion 16A through which the imaging optical system 12 passes, the imaging optical system 12 and the light sources 13 can be made substantially flush with each other. Accordingly, the heating components can be collected in one place, which makes it easy to design, e.g. the heat sink 17 for cooling the heating components. Also, the substrate 16 and the imaging optical system 12 can be formed integrally as a single unit, and the space for the substrate 16 and the imaging optical system 12 can be decreased as compared with the case where they are provided individually.

Since the one or more light sources 13 include a plurality of light sources and the plurality of light sources can be turned on independently of one another, the light beams emitted from the light sources 13 can be distinguished. It is thus possible to obtain detailed information of scattered light of the inspection target 23 from the images captured by the imaging optical system 12 and thus improve the accuracy of the inspection further.

In the following modification and second embodiment, the components that differ from those of the foregoing first embodiment will be described and the overlapping components will not be shown or described.

Modification

The modification is similar to the foregoing first embodiment, except for the color of the light sources 13 of the optical inspection apparatus 11.

For example, one of the light sources 13 may be configured by a red LED, another one of them may be configured by a blue LED, another one of them may be configured by a green LED, and another one of them may be configured by a white LED. The combination of the colors of the light sources 13 is not limited to this example, but some optional colors can, of course, be combined. The modification makes it possible to distinguish azimuth directions from which light beams are emitted by color. That is, the modification brings about the advantage that more detailed information of scattered light can be obtained from the colors of images captured by the imaging optical system 12.

Second Embodiment

An optical inspection apparatus 11 of a second embodiment will be described with reference to FIGS. 6 to 8. The second embodiment is different from the first embodiment in the configuration of a light guide 15 and similar thereto in the other components.

The light guide 15 is configured like a hollow square tube (square box) by light-transmitting material. A plurality of light sources 13 (four light sources 13) are provided at their respective four corners of the square tubular light guide 15. The central axis of the light guide 15 coincides with the optical axis 14 of the imaging optical system 12. The light guide 15 has a sufficiently large hollow region 15A inside. The inner surface of the light guide 15 is thus prevented from falling within a view range 18 of the imaging optical system 12. In the present embodiment, therefore, the viewing angle of the imaging optical system 12 is widely secured.

Since, furthermore, the light guide 15 is shaped like a square tube, the height of the light guide 15 can freely be changed.

The light guide 15 has only to be made of any light-transmitting material and it is made favorably of a light-transmitting resin material such as acrylic; however, the material of the light guide is not limited thereto. The light guide 15 may be made of polycarbonate, glass or the like. The light guide 15 can be formed by injection molding or machining (cutting by a lathe, an NC lathe, etc.).

Figure 6:
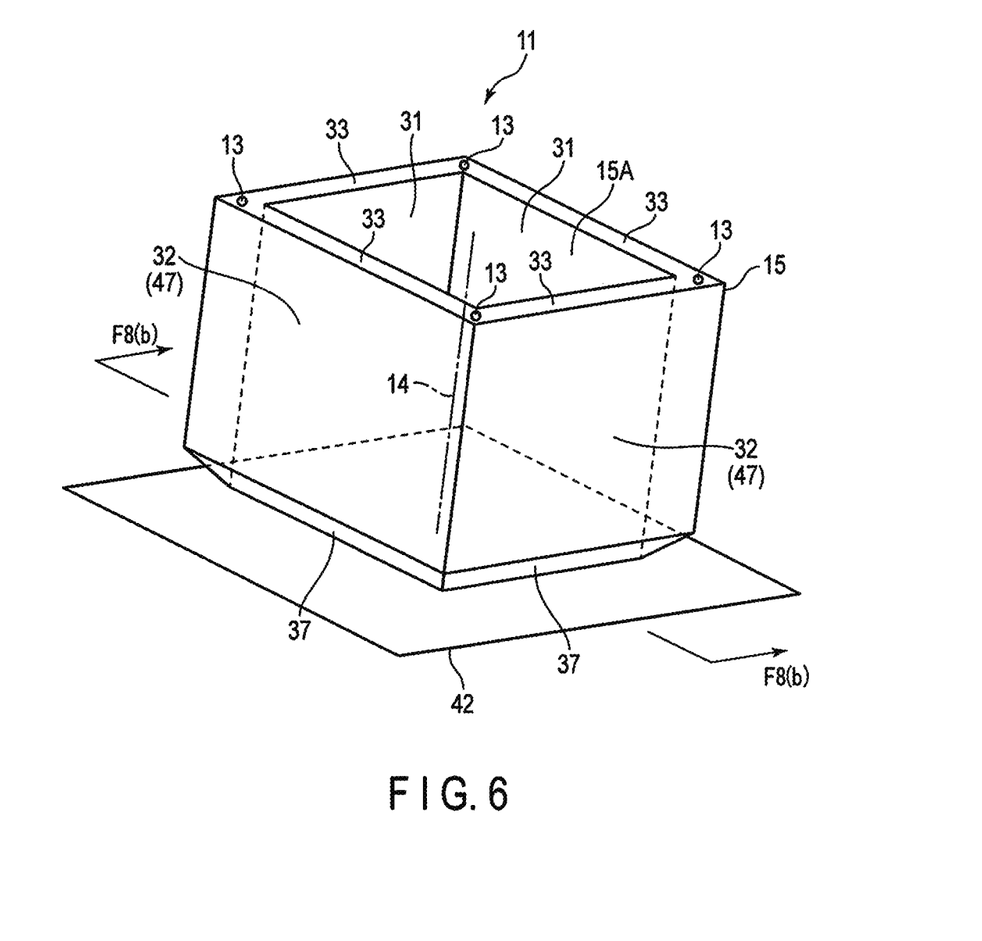
FIG. 6 is a perspective view showing a light guide and one or more light sources of an optical inspection apparatus of a second embodiment.
Figure 7:
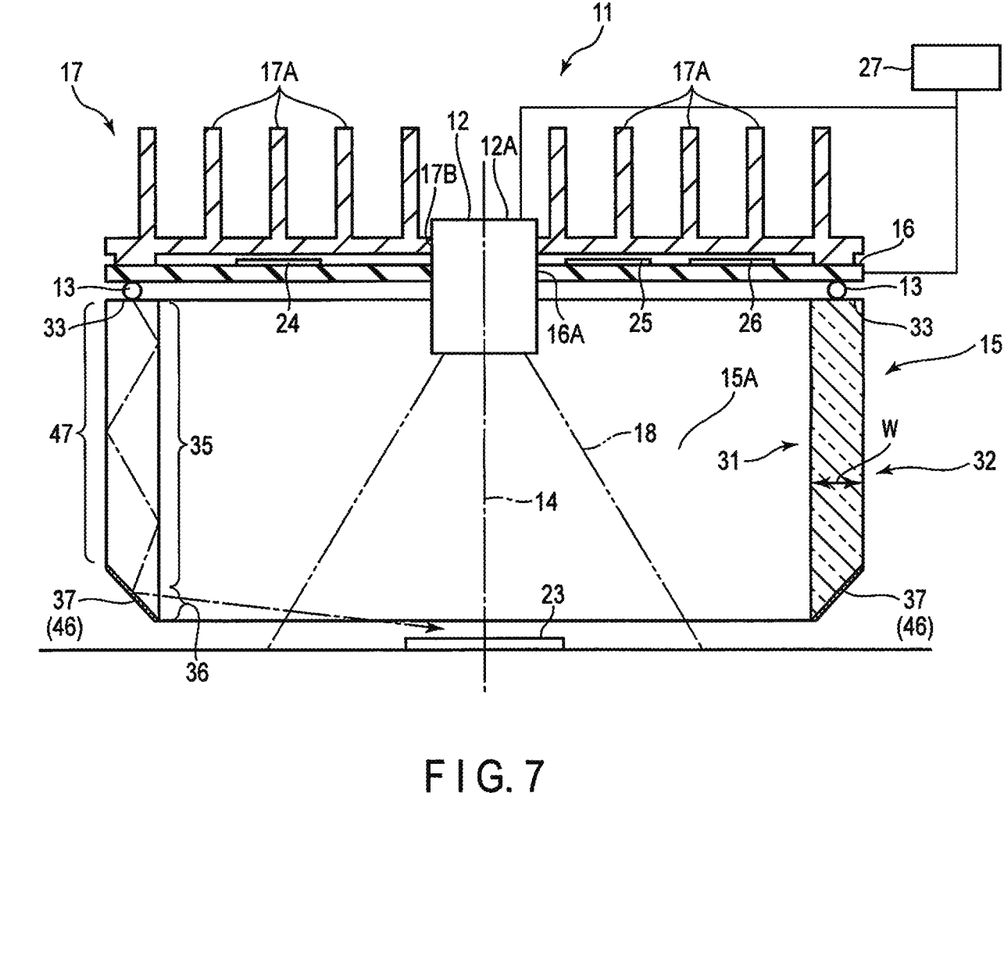
FIG. 7 is a sectional view of the optical inspection apparatus of the second embodiment, cut along the surface including an optical axis.
Figure 8:
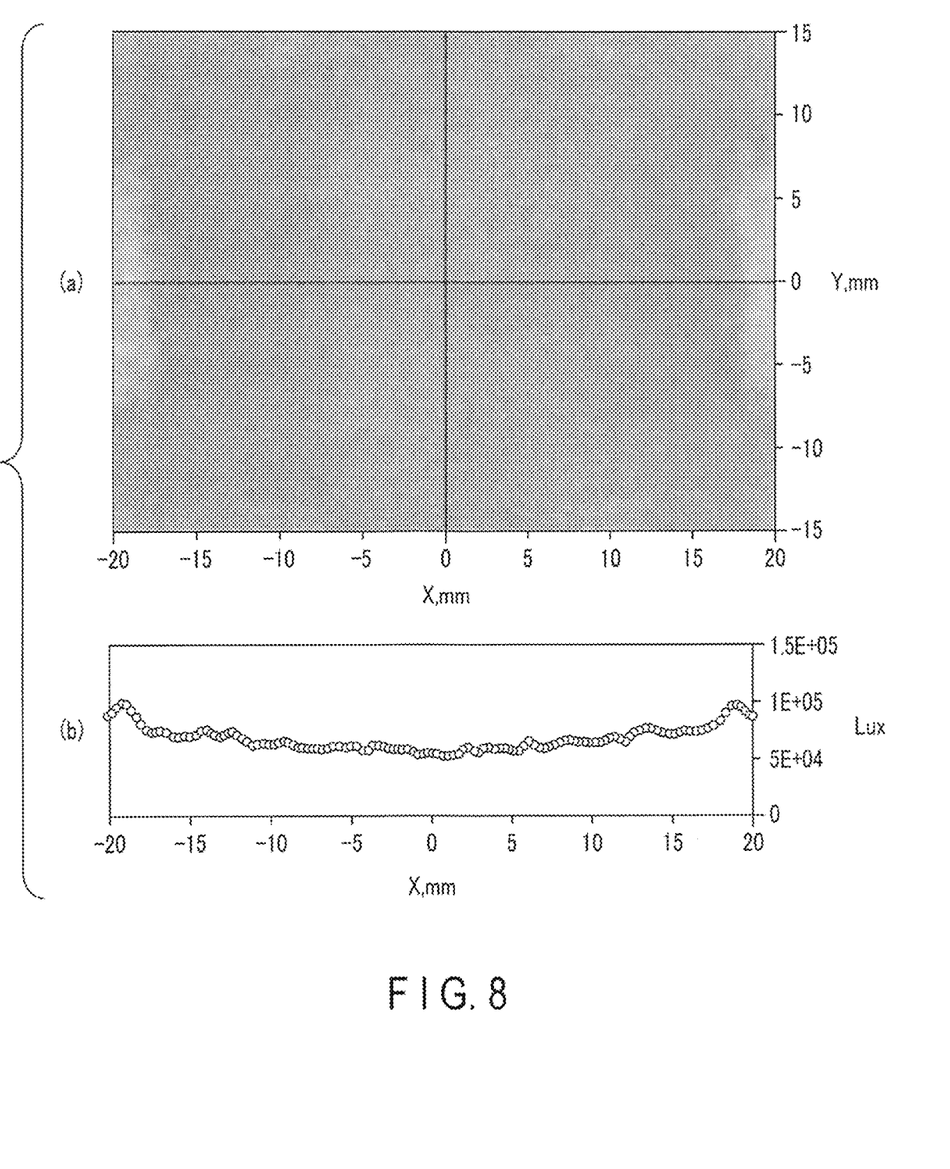

As shown in FIGS. 6 and 7, the light guide 15 has an inner surface (inner peripheral surface) 31, an outer surface (outer peripheral surface) 32, a first end face 33 alongside the imaging optical system 12, a flat total reflecting surface 35 provided on the inner surface 31, and a flat transmission surface 36 provided on the inner surface 31. The inner surface 31 is close to the main optical axis 14 and the outer surface 32 is far from the main optical axis 14. In the second embodiment, the thickness W between the inner surface 31 and the outer surface 32 of the light guide 15 is maintained constant between the total reflecting surface 35 and a second total reflecting surface 47 to be described later.

The total reflecting surface 35 and transmission surface 36 of the inner surface 31 are transparent. The total reflecting surface 35 is provided closer to the light sources 13 than the transmission surface 36. The total reflecting surface 35 and transmission surface 36 are smoothed by surface treatment such as buffing. However, the surface treatment of the inner surface 31 is not limited to this. The transmission surface 36 of the inner surface 31 may, for example, be sandblasted to serve as a diffusion surface capable of diffusing light that has been transmitted through the transmission surface 36. The total reflecting surface 35 can totally internally reflect the light that has struck into the light guide 15 from the first end face 33. The transmission surface 36 transmits the light reflected by the mirror surface 37 toward the inspection target 23. At that time, the transmission surface 36 refracts the light transmitted through the transmission surface 36.

In the second embodiment, there is no boundary between the total reflecting surface 35 and the transmission surface 36. At the midpoint between the total reflecting surface 35 and the transmission surface 36, therefore, the total reflecting surface 35 is applied to a certain light beam and the transmission surface 36 is applied to another light beam. If the boundary between the total reflecting surface 35 and the transmission surface 36 is ambiguous as described above, a minor light beam can also travel to the inspection target, with the result that instrument efficiency can be improved.

The outer surface 32 includes a flat second total reflecting surface 47 provided alongside the light sources 13 (alongside the imaging optical system 12) and a mirror surface 37 provided alongside the inspection target 23. The second total reflecting surface 47 is transparent. The second total reflecting surface 47 can totally internally reflect the light that has struck into the light guide 15 from the light sources 13. The second total reflecting surface 47 of the outer surface 32 is smoothed by surface treatment such as buffing.

The mirror surface 37 is formed on a chamfered portion 46 outside of an end portion of the light guide 15 alongside the inspection target 23. That is, the chamfered portion 46 is obtained by chamfering the corners of the end portion of the light guide 15 alongside the inspection target 23. It can also be said that the distal end portion of the light guide 15 is tapered at an angle of about 45°.

The mirror surface 37 can reflect the light struck into the light guide 15 from the light sources 13, toward the inspection target 23. The mirror surface 37 is treated by depositing aluminum or the like on the chamfered portion 46 of the outer surface 32. The method of forming the mirror surface 37 is not limited to this. For example, another member having a mirror surface may be brought into intimate contact with the outer surface 32 so that the chamfered portion 46 reflects light.

In the second embodiment, too, at the position where the mirror surface 37 is provided, the thickness W between the inner and outer surfaces 31 and 32 of the light guide 15 decreases as it moves away from the imaging optical system 12.

The irradiation field that is irradiated with light from the light guide 15 is located in a position of, e.g. 5 mm from the second end face 34 that is the distal end of the light guide 15. However, the position of the irradiation field is not limited to this example.

The operation of the optical inspection apparatus 11 of the second embodiment will be described with reference to FIGS. 7, 8(a) and 8(b). The light struck into the light guide 15 from the light sources 13 is totally internally reflected by the total reflecting surface 35 and also totally internally reflected by the second total reflecting surface 47. The light may be totally internally reflected by these surfaces a plurality of times. The light totally internally reflected by the total reflecting surface 35 reaches the mirror surface 37 and is reflected toward the inspection target 23 by the mirror surface 37. The light reflected by the mirror surface 37 is refracted by the transmission surface 36 and transmitted to the inspection target 23. The imaging optical system 12 can thus detect the light (scattered light) radiated to the inspection target 23 and reflected by the inspection target 23 to capture an image of the inspection target 23.

FIG. 8(a) shows the illuminance distribution using light tracking simulation. FIG. 8(b) shows the illuminance distribution of FIG. 8(a) on the line F8(b)-F8(b) in FIG. 6 (on the straight line intersecting the optical axis 14). It is seen from both the figures that a substantially uniform illuminance distribution is achieved in the irradiation field (inspection surface 42). Incidentally, in FIG. 8(b), 5E+04 means $5 \times 10^4$. In FIG. 8(b), the unit of the illuminance is Lux.

According to the second embodiment, the following matters can be achieved.

Since the light guide 15 is shaped like a square tube, the shape of the light guide 15 can be simplified and the manufacturing costs thereof can be lowered.

The mirror surface 37 is formed on the chamfered portion 46 outside one end portion of the light guide 15 alongside the inspection target 23 to guide light to the inspection target 23. The light guide 15 can thus be shaped irrespective of its height. That is, the height of the light guide 15 can be increased and the distance between the inspection target 23 and each of the light sources 13 can be increased, for example, in order to prevent the inspection target 23 from being influenced by heat from the light sources 13 and the like. On the other hand, the inspection apparatus 11 can be compacted by decreasing the height of the light guide 15, for example, in order to compact the light guide 15 in terms of space for the apparatus. Therefore, the optical inspection apparatus 11 can be improved in the degree of freedom of design and applied to various inspection apparatuses, manufacturing machines, production lines and the like.

Since the light sources 13 are provided at their respective corners of the square tubular light guide 15, the light emitted from the light sources 13 can uniformly be spread in the circumferential direction in the light guide 15. This makes it possible to ensure sufficient brightness in the irradiation field (inspection surface 42). Since, furthermore, the light struck into the light guide 15 from the light sources 13 is spread in the light guide 15, the distribution of light toward the inspection target 23 from the transmission surface 36 can be narrowed using the Etendue conservation law. High-accuracy inspection can thus be conducted. Moreover, the number of light sources 13 is small, i.e., only four.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions. The inventions of the embodiments and their modifications can appropriately be, of course, combined into one invention.

The invention claimed is:

1. An optical inspection apparatus comprising:
   an imaging optical system opposed to an inspection target;
   one or more light sources provided around the imaging optical system and spaced away from one another;
   a light guide extending cylindrically along an optical axis of the imaging optical system, and an end face of the light guide opposed to the one or more light sources;
   a total reflecting surface formed on an inner surface of the light guide to totally internally reflect light struck into the light guide from the end face;
   a mirror surface formed on an outer surface of the light guide to reflect light struck into the light guide from the one or more light sources, toward the inspection target; and
   a transmission surface formed on the inner surface of the light guide to transmit the light reflected by the mirror surface, toward the inspection target,
   wherein the total reflecting surface and the transmission surface are on a medium forming the inner surface of the light guide.

2. The optical inspection apparatus of claim 1, wherein the total reflecting surface includes an area that is closer to the one or more light sources than the transmission surface.

3. The optical inspection apparatus of claim 1, wherein the inner surface of the light guide is located outside a view range of the imaging optical system.

4. The optical inspection apparatus of claim 1, wherein a thickness between the inner surface and the outer surface of the light guide decreases as the light guide moves away from the imaging optical system.

5. The optical inspection apparatus of claim 1, wherein the one or more light sources are arranged on a circumference of one circle with the optical axis centered.

6. The optical inspection apparatus of claim 1, wherein the light guide is cylindrical.

7. The optical inspection apparatus of claim 1, wherein a diameter of the inner surface of the light guide increases as the light guide moves away from the one or more light sources.

8. The optical inspection apparatus of claim 1, wherein the mirror surface of the light guide is an arc surface projected in a direction away from the optical axis.

9. The optical inspection apparatus of claim 1, wherein the inner surface of the light guide is an arc surface projected in a direction close to the optical axis.

10. The optical inspection apparatus of claim 1, wherein the light guide is shaped like a square tube.

11. The optical inspection apparatus of claim 10, wherein the one or more light sources are provided at corners of the light guide shaped like a square tube.

12. The optical inspection apparatus of claim 1, wherein the mirror surface is formed on a chamfered portion outside an end portion of the light guide alongside the inspection target.

13. The optical inspection apparatus of claim 1, further comprising a heat sink thermally connected to the one or more light sources.

14. The optical inspection apparatus of claim 1, further comprising a substrate mounted with the one or more light sources and including a through-hole portion through which the imaging optical system passes.

15. The optical inspection apparatus of claim 1, wherein the one or more light sources include a plurality of light sources, and the plurality of light sources have different colors.

16. The optical inspection apparatus of claim 1, wherein the one or more light sources include a plurality of light sources, and the plurality of light sources are turned on independently of one another.

17. The optical inspection apparatus of claim 1, wherein the inner surface of the light guide is an arc surface that is projected in a direction approaching the optical axis.

18. An optical inspection apparatus comprising:
   an imaging optical system opposed to an inspection target;
   one or more light sources provided around the imaging optical system and spaced away from one another;
   a light guide extending cylindrically along an optical axis of the imaging optical system, and an end face of the light guide opposed to the one or more light sources;
   a total reflecting surface formed on an inner surface of the light guide to totally internally reflect light struck into the light guide from the end face;
   a mirror surface formed on an outer surface of the light guide to reflect light struck into the light guide from the one or more light sources, toward the inspection target; and
   a transmission surface formed on the inner surface of the light guide to transmit the light reflected by the mirror surface, toward the inspection target,
   wherein when a distance from an incident pupil surface of the imaging optical system to the inspection target is 1, a light distribution angle of a main light beam emitted from the light guide is θ, a closest distance from the optical axis to the inner surface is R, and an extension distance of the light guide from the incident pupil surface along the optical axis is L, a following expression is satisfied:

$$l - \frac{R}{\tan\theta} < L < l. \qquad \text{(numerical expression 1)}$$

19. An optical inspection apparatus comprising:
   an imaging optical system opposed to an inspection target;
   one or more light sources provided around the imaging optical system and spaced away from one another;
   a light guide extending cylindrically along an optical axis of the imaging optical system, and an end face of the light guide opposed to the one or more light sources;

a total reflecting surface formed on an inner surface of the light guide to totally internally reflect light struck into the light guide from the end face;

a mirror surface formed on an outer surface of the light guide to reflect light struck into the light guide from the one or more light sources, toward the inspection target;

a transmission surface formed on the inner surface of the light guide to transmit the light reflected by the mirror surface, toward the inspection target; and a cylindrical light guide convex portion protruding toward the one or more light sources from the end face along the inner surface of the light guide and provided continuously with the light guide, and wherein a thickness of the light guide convex portion is smaller than the thickness between the inner surface and the outer surface.

\* \* \* \* \*